(12) United States Patent
Giefer

(10) Patent No.: US 6,598,494 B1
(45) Date of Patent: Jul. 29, 2003

(54) SELECTOR DEVICE FOR A VEHICLE WITH AN AUTOMATIC GEAR SYSTEM

(75) Inventor: Andreas Giefer, Lemförde (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/807,264

(22) PCT Filed: Aug. 9, 2000

(86) PCT No.: PCT/DE00/02715

§ 371 (c)(1),
(2), (4) Date: Apr. 9, 2001

(87) PCT Pub. No.: WO01/11270

PCT Pub. Date: Feb. 15, 2001

(30) Foreign Application Priority Data

Aug. 10, 1999 (DE) .......................... 199 37 698

(51) Int. Cl.$^7$ ........................... B60K 20/00; G05G 9/00
(52) U.S. Cl. ............... 74/473.18; 74/473.33; 74/471 XY
(58) Field of Search ............. 74/473.18, 473.33, 74/471 XY, 473.21, 473.23

(56) References Cited

U.S. PATENT DOCUMENTS

| | | | | |
|---|---|---|---|---|
| 5,689,996 A | * | 11/1997 | Ersoy ........................ 74/335 |
| 5,819,591 A | * | 10/1998 | Meyer .................... 74/473.18 |
| 5,870,929 A | * | 2/1999 | Bravo ..................... 74/473.18 |
| 5,884,529 A | * | 3/1999 | Meyer .................... 74/473.18 |
| 6,120,412 A | * | 9/2000 | Fujinuma ................... 477/99 |
| 6,125,714 A | * | 10/2000 | Woeste et al. ........... 74/473.18 |
| 6,192,770 B1 | * | 2/2001 | Miyoshi et al. ......... 74/473.18 |

FOREIGN PATENT DOCUMENTS

| | | |
|---|---|---|
| DE | 196 00 526 C2 | 6/1996 |
| DE | 195 26 059 A1 | 1/1997 |
| DE | 196 10 766 A1 | 9/1997 |
| DE | 196 20 515 C2 | 11/1997 |
| DE | 196 32 736 C2 | 2/1998 |
| DE | 196 33 948 A1 | 2/1998 |
| DE | 197 56 034 A1 | 7/1999 |
| DE | 198 53 934 A1 | 5/2000 |
| EP | 0 770 799 A2 | 5/1997 |

\* cited by examiner

*Primary Examiner*—David A. Bucci
*Assistant Examiner*—Justin Stefanon
(74) *Attorney, Agent, or Firm*—McGlew and Tuttle, P.C

(57) ABSTRACT

A shifting device of a motor vehicle automatic transmission has a selector lever (3) and a kinematics (4–9) for transmitting the selection movements to an automatic transmission. The selector lever (3) can be moved around a first shift axis (7) in an automatic shift gate AG for selecting automatic gears and around a second shift axis (8) in a sequence shift gate SG1, SG2 for manually upshifting and downshifting gears. A central carrier (6) is pivotable around a selector axis (9). An inner bridge (4) is mounted pivotably on the central carrier (6) and is pivotable around the first shift axis (7) extending essentially at right angles to the selector axis (9). An outer bridge (5) is mounted on the inner bridge (4) in the sequence shift gate pivotably around the second shift axis (8) and is connected to the selector lever (3). The shift selector for selecting the shift axes by a pivoting movement of the selector lever (3) is indirectly or directly fastened to the central carrier (6).

28 Claims, 16 Drawing Sheets

SELECTOR DEVICE FOR A VEHICLE WITH AN AUTOMATIC GEAR SYSTEM

FIELD OF THE INVENTION

The present invention pertains to a shifting device of a motor vehicle automatic transmission with a selector lever and a kinematics for transmitting the selection movements to an automatic transmission, wherein the selector lever can be moved around a first shift axis in an automatic shift gate for selecting automatic gears and around a second shift axis in a sequence shift gate for the manual upshifting and downshifting of gears, wherein a central carrier pivotable around a selector axis, an inner bridge, which is mounted pivotably on the central carrier and is pivotable around the first shift axis extending essentially at right angles to the selector axis, and an outer bridge, which is mounted on the inner bridge in the sequence shift gate, is pivotable around the second shift axis and is connected to the selector lever, are provided.

BACKGROUND OF THE INVENTION

A shifting device of a motor vehicle automatic transmission, which has a selector lever and a kinematics for transmitting the selection movements to the automatic transmission, has been known from German Offenlegungsschrift DE 195 26 059 A1, in which the selector lever can move in an automatic shift gate for selecting automatic gears and in a sequence shift gate for the manual upshifting and downshifting of gears. The shifting device is designed such that the automatic shift gate is arranged on the right when viewed in the direction of travel and the sequence shift gate is located to the left of it. The embodiment of the shifting device shown is designed for a vehicle with the steering wheel on the left. If a corresponding shifting device is to be installed in a vehicle with the steering wheel on the right, the arrangements of the automatic shift gate and the sequence shift gate must be transposed for ergonomic reasons. This means that the automatic shift gate is located on the left-hand side and the sequence shift gate to the right of it in a vehicle with the steering wheel on the right. To bring about this reversal, it is necessary to manufacture the shifting device in a mirror-image version. Such measures always mean great efforts because new sets of drawings must be prepared, and new tools must be manufactured, and NC programs must be rewritten. In addition, it is necessary concerning the stocking of spare parts to stock both types of shifting device. All the above-mentioned measures lead to a considerable cost and require close manufacturing tolerances.

Furthermore, the applicant's patent application with the official Reference No. 198 53 934.7, which was not previously published and whose disclosure content is herewith taken over fully into this application, discloses a shifting device, which has a selector lever and a kinematics for the transmission of the selection movements to an automatic transmission, where the selector lever can be moved in an automatic shift gate for selecting automatic gears and in a sequence shift gate for the manual upshifting and downshifting of gears around a selector axis, and where a central carrier, which is pivotable around a selector axis, an inner bridge, which is mounted pivotably on the central carrier and is pivotable around a first shift axis extending essentially at right angles to the selector axis, and an outer bridge, which is mounted on the inner bridge, is pivotable around a second shift axis and is connected to the selector lever, are provided. The changeover between the kinematic situation in the automatic shift gate and the kinematic situation in the sequence shift gate is achieved here by the engagement of two locking elements in locking element engagements, wherein the locking element engagements are stationarily and rigidly connected to the housing of the shifting device. This necessary cooperation of a freely movable unit (=movable parts of the shifting device) with a stationary housing of the shifting device requires close tolerances in manufacture and great assembly efforts. The manufacturing tolerances become especially problematic when short shifting paths become necessary for the changeover from one gate into the other.

SUMMARY AND OBJECTS OF THE INVENTION

The object of the present invention is therefore to find a shifting device for an automatic transmission with sequential shifting possibility, which is equally suitable for vehicles with the steering wheel on the right and for vehicles with the steering wheel on the left and can be embodied at the same time with components that can be manufactured with low requirements on the manufacturing tolerances, without deteriorating the clearance of the shifting device or even improving it.

According to the invention, a shifting device of a motor vehicle automatic transmission has a selector lever provided with kinematics for transmitting the selection movements to an automatic transmission. The selector lever can be moved around a first shift axis in an automatic shift gate (AG) for selecting automatic gears and around a second shift axis in a sequence shift gate (SG1, SG2) for manually upshifting and downshifting gears. A central carrier is pivotable around a selector axis. An inner bridge is mounted pivotable on the central carrier and is pivotable around the first shift axis extending essentially at right angles to the selector axis. An outer bridge is mounted on the inner bridge in the sequence shift gate and is pivotable around the second shift axis and is connected to the selector lever. A device for selecting the shift axes by a pivoting movement of the selector lever is indirectly or directly fastened to the central carrier.

Thus, it is proposed that the shifting device for a motor vehicle automatic transmission with a selector lever and a kinematics for transmitting the selection movements to an automatic transmission, wherein the selector lever can be moved around a first shift axis in an automatic shift gate for selecting automatic gears and around a second shift axis in a sequence shift gate for the manual upshifting and downshifting of gears, wherein a central carrier pivotable around a selector axis, an inner bridge, which is mounted pivotably on the central carrier and is pivotable around a first shift axis extending essentially at right angles to the selector axis, and an outer bridge, which is mounted on the inner bridge in the sequential shift gate, is pivotable around the second shift axis and is connected to the selector lever, are provided, be improved such that means for selecting the shift axes by a pivoting movement of the selector lever are indirectly or directly fastened to the central carrier.

Direct fastening to the central carrier can be achieved, e.g., by arranging axes or indirect fastening can be achieved by means of coupling rods.

Using a shifting device of such a design, it is now possible, on the one hand, to use the same shifting device in vehicles with the steering wheel on the right and in vehicles with the steering wheel on the left, and the same middle movement space can be used for the automatic shift gate in both types of vehicles, while the left-hand movement space can be used for the sequence shift gate in a vehicle with the steering wheel on the left and the right-hand movement space can be used for the sequence shift gate in a vehicle with the steering wheel on the right. On the other hand, particularly high requirements are not imposed on the manufacturing tolerances of the individual parts of the shifting device according to the present invention, and the clearance of the shifting device is reduced. At the same time, the gate change angle can be kept very small, which leads to pleasantly short shifting paths for the driver.

In a preferred embodiment of the shifting device according to the present invention, the means or device for selecting the shift axes can permit a pivoting movement of the selector lever around the first shift axis (=automatic shift axis) in the case of the selection of the automatic gate and a pivoting movement around the second shift axis (=sequence shift gate) in the case of the selection of the sequence shift gate.

The device or means for selecting the shift axes of the shifting device may preferably also have swivel arms which are mounted pivotably around a third axis (=pivot axis) which extends at right angles to the selector axis and offset from the first shift axis.

Furthermore, the means for selecting the shift axes, especially the swivel arms, may have at least one locking element engagement, which can be engaged by a locking element of the outer bridge each, depending on the position of the selector lever. The distance between one mount and the pivot axis may be equal to or smaller than the distance between the mount and the corresponding locking element engagement. A lever arm is generated as a result, which brings about a large movement of the ends of the swivel arms and consequently of the locking element engagements from relatively small pivoting movements of the central carrier around the longitudinal axis. This ultimately makes it possible to keep small the lateral pivoting movements of the selector lever for changing over between the automatic shift gate and the sequence shift gate.

The arrangement of the pivot axis, the mount (of the swivel arm on the housing, but around the pivot axis) and the locking element engagement can be performed, on the one hand, in the sequence indicated and shown in the exemplary embodiment, but it is also possible to use the sequence "mount, pivot axis and locking element engagement," and there is a greater lever arm between the pivot axis and the locking element engagement compared with the lever arm between the pivot axis and the mount in this case of well. Intensification of the movement is achieved as a result of this as well.

In addition, the means for selecting the shift axes, especially the swivel arms, may have a mount each, which are arranged eccentrically to the pivot axis. A possible advantageous embodiment of this mount is that one mount is a movable mount with two degrees of freedom. The two degrees of freedom preferably consist of a pivoting movement around a transverse axis and a pivoting movement around the longitudinal axis of the swivel arms.

An advantageous embodiment of the mount may be, e.g., the one in which one mount has an opening in the swivel arm and a stationary mounting pin, which engages the opening and is preferably connected to a shift housing, and in the case of two mounting pins, these may be arranged coaxially. Corresponding to the necessary freedom of movement of the swivel arms, an elastically designed mounting pin may be used or the opening may have a corresponding clearance. It is also possible to design the mounting pin as a ball head, which is mounted in a spring-tensioned manner in the opening.

Concerning the arrangement of the axes, an advantageous embodiment of the shifting device is the one in which the third axis intersects the selector axis. This can be achieved, e.g., by arranging the third axis in the form of two lateral swivel axles in the central carrier.

According to another special embodiment of the shifting device, the first shift axis extends through the locking element, of which there is at least one. In addition, the locking element, of which there is at least one, and the locking element engagement, of which there is at least one, can bring about a connection rotating in unison between the inner bridge and the outer bridge in the case of mutual engagement.

The degrees of freedom of movement of the selector lever of the shifting device can be limited according to the present invention by means for limiting movement gates and/or movement spaces being provided. These may be fastened at least partly to the housing, on the one hand, and/or at least partly to the inner and/or outer bridge, on the other hand. According to another embodiment of the shifting device according to the present invention, three movement spaces (I, II, III), which are located next to one another and are preferably directed essentially in parallel to one another, are provided, and two adjacent movement spaces (I, II; II, III) each are provided for different functions.

In this embodiment, the movement space (II) located on the inside can be used as the automatic shift gate and the two movement spaces (I, III) located on the outside can be used as sequence shift gates.

In addition, the width and optionally the length of the automatic shift gate and the sequence shift gate, of which there is at least one, may be formed or additionally limited by a movement shifting gate for the selector lever. The movement shifting gate preferably has a single automatic shift gate and a single sequence shift gate, and a connection gate (selection gate) is provided between the automatic shift gate and the sequence shift gate.

Corresponding to a special embodiment, the inventor proposes, furthermore, that the first and second shift axes be arranged eccentrically and/or in parallel to one another.

It is obvious that the above-mentioned features of the present invention, which will be explained below, may be used not only in the particular combination described but also in other combinations or alone, without going beyond the scope of the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
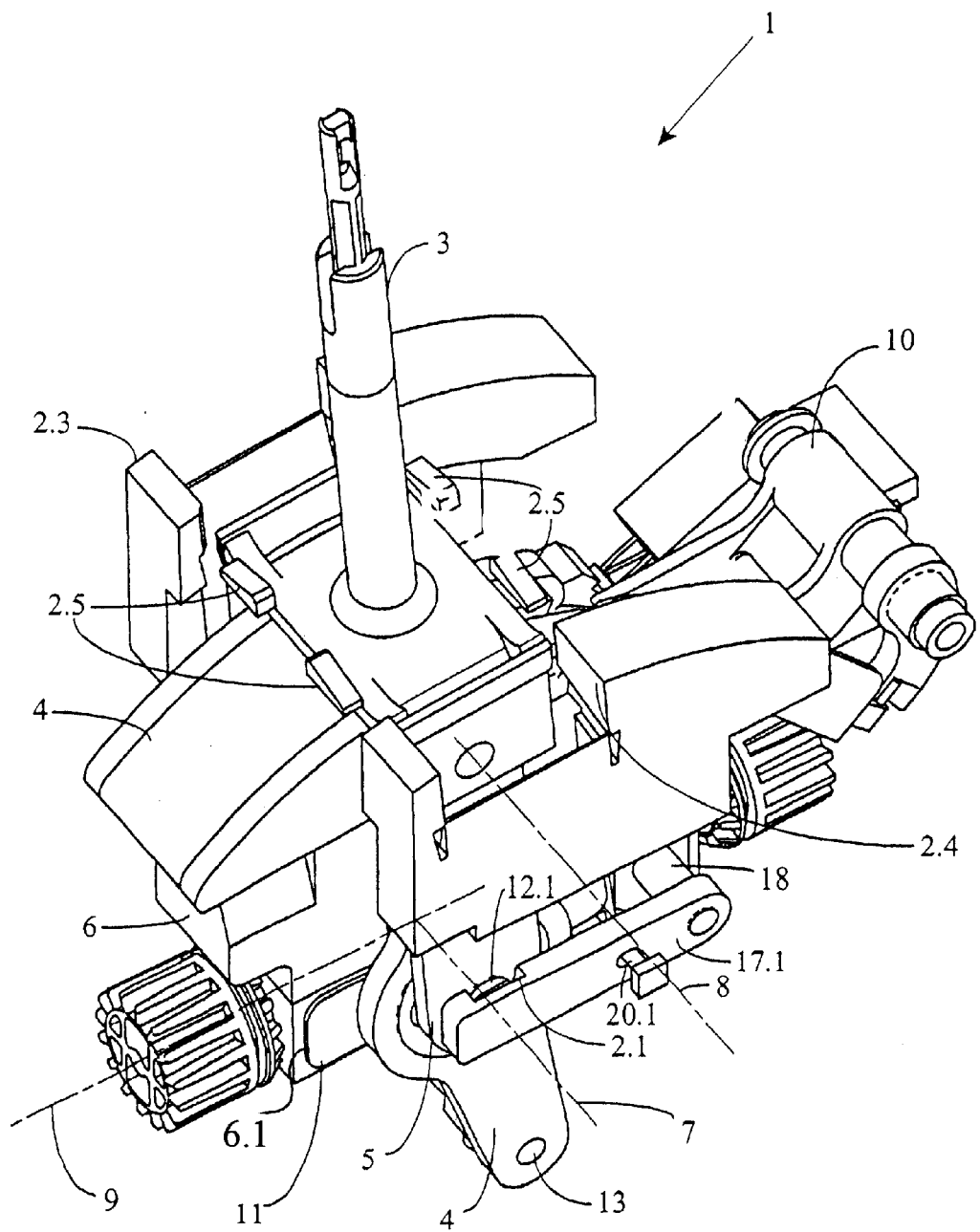
FIG. 1 is a perspective side view of the shifting device from the right with the selector lever in the middle position in the automatic shift gate.

Referring to the drawings in particular, FIGS. 1 through 5 show different perspective views of a preferred exemplary embodiment of the shifting device according to the present invention with different positions of the selector lever. The design of this shifting device with its kinematically acting elements is symmetrical in relation to a vertical plane through the shifting device, which plane is located in the direction of the vehicle.

The shifting device 1 comprises essentially a central carrier 6, which is mounted around a selector axis 9 extending in the direction of the vehicle in a housing 2, which is shown here only partially. On both longitudinal sides, the central carrier 6 has an opening 6.1 for a mounting insert 11. The central carrier 6 is surrounded laterally by a U-shaped, inner bridge 4, which has on both sides a round axial opening 4.1, which is engaged by the mounting insert 11 with the axial element 11.1, so that the inner bridge and the axis formed by the mounting insert 11 can rotate. The mounting inserts 11 arranged on both sides on the central carrier 6 thus generate a first shift axis 7, around which the inner bridge 4 can pivot. In addition, the central carrier 6 is able to pivot around the selector axis 9 extending at right angles to the first shift axis 7 within the housing 2.

The inner bridge 4 is itself surrounded in turn by an outer bridge 5, and the inner and outer bridges 4 and 5 are connected to one another in the upper area by the second shift axis 8 rotatably around this axis. Furthermore, the outer bridge 5 has a locking element 12.1 and 12.2 each on both sides in the lower area, and in the middle position, the locking elements engage according to the present invention locking element engagements 2.1 and 2.2 arranged on both sides on the housing 2.

The locking element engagements 2.1 and 2.2 are designed here as openings of a right and left swivel arm 17.1 and 17.2, respectively, wherein the swivel arms 17.1 and 17.2 are mounted at their ends on the pivot axis 18 extending at right angles to the selector axis 9. The swivel arms 17.1 and 17.2 themselves have a respective hole 19.1 and 19.2, which are engaged by a mounting pin 20.1 and 20.2, respectively, which are rigidly connected to the housing. The holes 19.1 and 19.2 are dimensioned such that a movable mounting of the swivel arms 17.1, 17.2 with two degrees of freedom (rotation around the respective pin axes 21.1 and 21.2 and rotation around the longitudinal axis of the swivel arm) is formed. The longitudinal axes 21.1 and 21.2 of the mounting pins 20.1 and 20.2 are arranged coaxially.

Consequently, fixation of the selector lever 3 in the X direction (=longitudinal axis of the vehicle =selector axis 9) in the automatic gate (=middle position) is achieved by means of the two swivel arms 17.1 and 17.2, which are mounted around the Y axis (=transverse axis of the vehicle=pivot axis 18). If the selector lever is pivoted sideways into the sequence shift gate, the swivel arms 17.1 and 17.2 release the locking elements 12.1, 12.2 for a pivoting movement of the selector lever 3 around the second shift axis 8 in conjunction with the locking element engagements 2.1, 2.2. Consequently, if the selector lever and hence the outer bridge 5 are in the middle movement space, a pivoting movement of the selector lever 3 in the longitudinal direction of the vehicle is transmitted via the outer bridge 5 and via the second shift axis 8 to the inner bridge 4, which will then also pivot around the first shift axis 7. If a sideways movement of the selector lever 3 takes place, the locking elements 12.1 and 12.2 separate from the locking element engagements 2.1 and 2.2, so that a pivoting movement of the selector lever 3 in the direction of the vehicle is no longer transmitted to the inner bridge 4 as a rotary movement around the first shift axis, but it leads only to a rotary movement of the outer bridge 5 around the second, upper shift axis 8.

To disengage the locking elements 12.1 and 12.2 from the locking element engagements 2.1 and 2.2, it is irrelevant in this case whether a pivoting movement of the selector lever to the right or to the left takes place. Furthermore, it is also sufficient to arrange only a single swivel arm on one side of the shifting device to achieve the function described. However, better movement processes are achieved by means of two symmetrically arranged swivel arms 17.1 and 17.2.

Consequently, three different movement spaces are generated in this manner for the selector lever 3 with different kinematic effects, and different functions are to be assigned to two adjacent movement spaces each. The selector lever 3 can be moved forward and backward in the direction of the vehicle in the middle movement space, as a result of which pivoting of the inner bridge 4 around the first shift axis 7 is generated. If the selector lever 3 is deflected sideways, a fundamentally new kinematic situation develops on the two sides, because the inner bridge 4 can now stop despite a pivoting movement of the selector lever 3 in the direction of the vehicle and only a pivoting movement of the outer bridge 5 around the second, upper shift axis 8 takes place. Consequently, three movement spaces are formed, which may have at least two fundamentally different functions. As is shown in this exemplary embodiment, it is possible in the middle movement space to connect the lower arm of the inner bridge 4 to a cable or a linkage, which transmits the pivoting movement in the middle movement space to an automatic transmission. The selection of the different gears of an automatic transmission is usually controlled by this movement. Furthermore, both the right-hand movement space and the left-hand movement space of the selector lever 3 can be used to trigger the sequential shifting of an automatic transmission. Electronic sensors, which respond, e.g., exclusively to a relative movement between the inner bridge 4 and the outer bridge 5, are usually used for this purpose. However, it is also possible to arrange sensors, e.g., in the cover and to pass on the movement information from there electronically. Since the shifting movements of the selector lever do not cause any movements of the inner bridge 4 in the lateral movement spaces, the cable connection to the transmission can also remain engaged despite shifting movements of the selector lever without triggering shifting operations via the cable.

Guide elements 2.3 through 2.5, which are rigidly connected to the housing 2, which is shown only partially, are additionally provided in the exemplary embodiment being shown to improve the guiding and to limit the movement spaces of the selector lever 3. The guide elements 2.3 and 2.4 are a movement shaft acting in both directions, into which the inner and outer bridges 4 and 5 can be introduced by laterally pivoting the selector lever 3. If the selector lever 3 and consequently the inner and outer bridges 4 and 5 are in a lateral position, the respective guide elements 2.3 and 2.4 prevent the inner bridge 4 from tilting, while the outer bridge 5 continues to be movable around the second shift axis 8. The guide of the selector lever 3 is additionally also guided by the guide elements 2.5.

The selector lever 3 is in the middle position in the middle movement space in FIG. 1.

Figure 2:
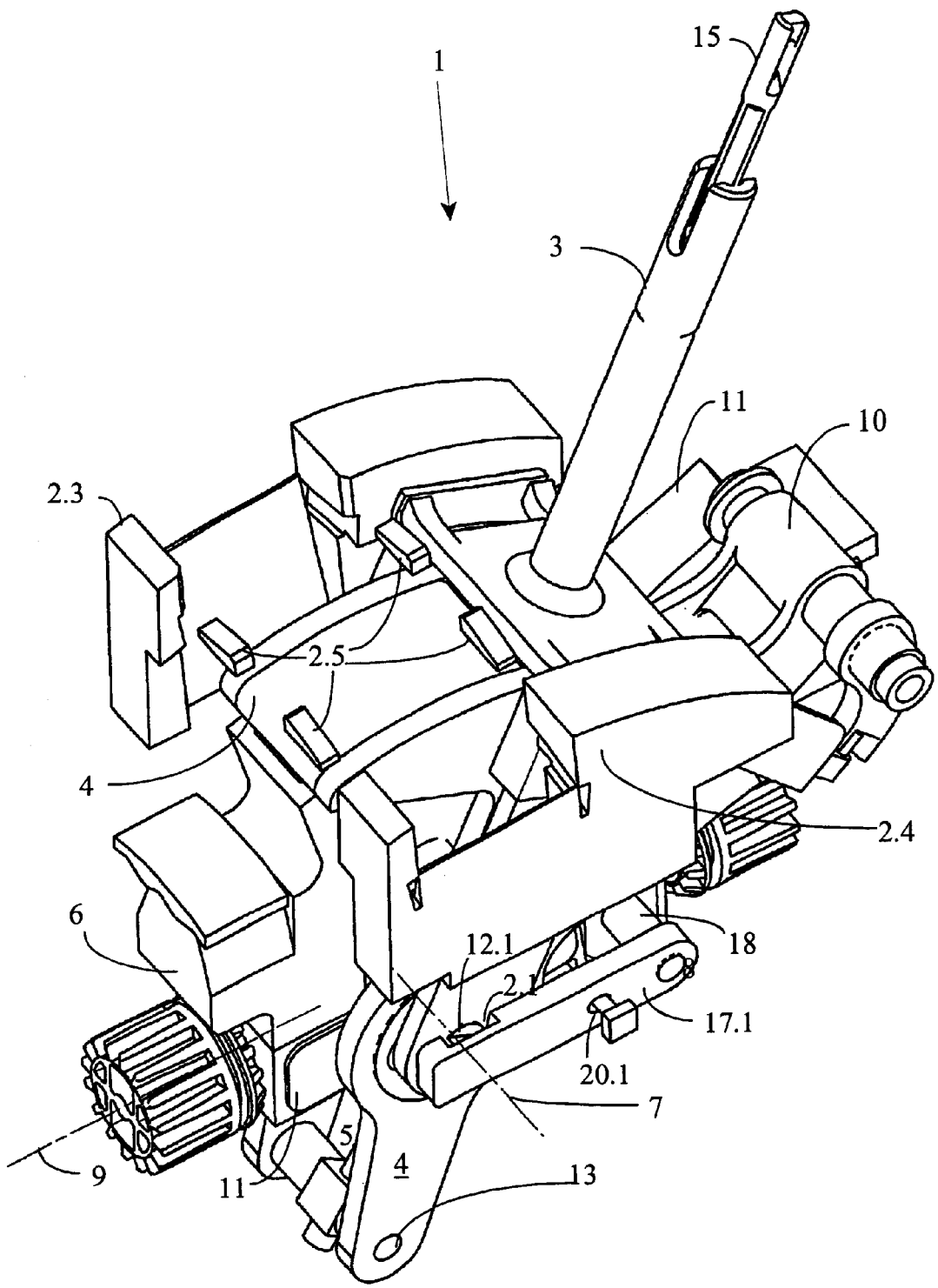
FIG. 2 is a perspective side view of the shifting device from the right with the selector lever in position "P" in the automatic shift gate.

FIG. 2 shows the same view as FIG. 1, but the selector lever 3 is in the middle movement space, in a front position. This corresponds to position "D" of the automatic transmission.

Figure 3:
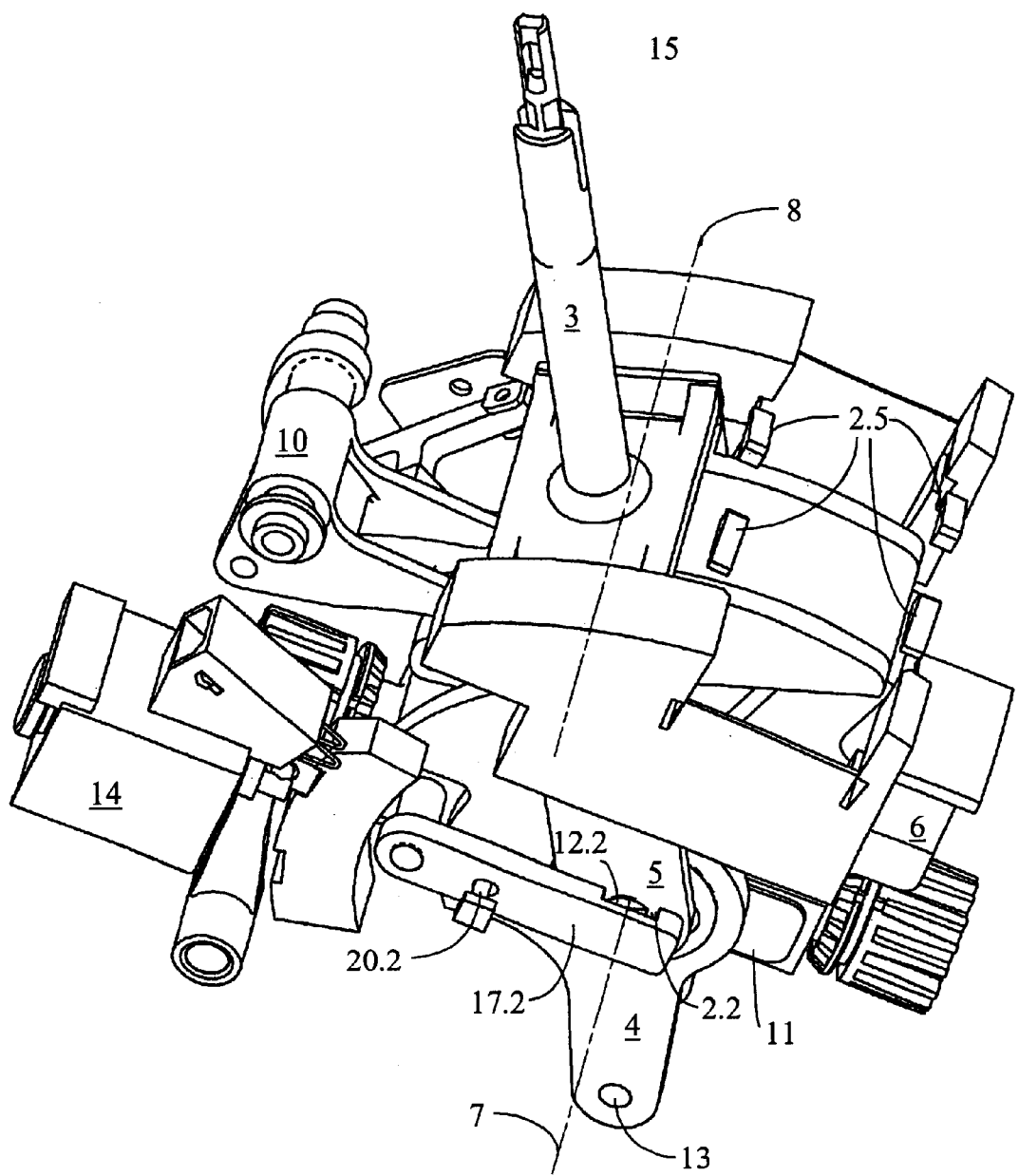
FIG. 3 is a perspective side view of the shifting device from the left with the selector lever in position "P" in the automatic shift gate.

FIG. 3 shows the shifting device 1 with the selector lever 3 in the same position as in FIG. 2, but from the opposite side.

Figure 4:
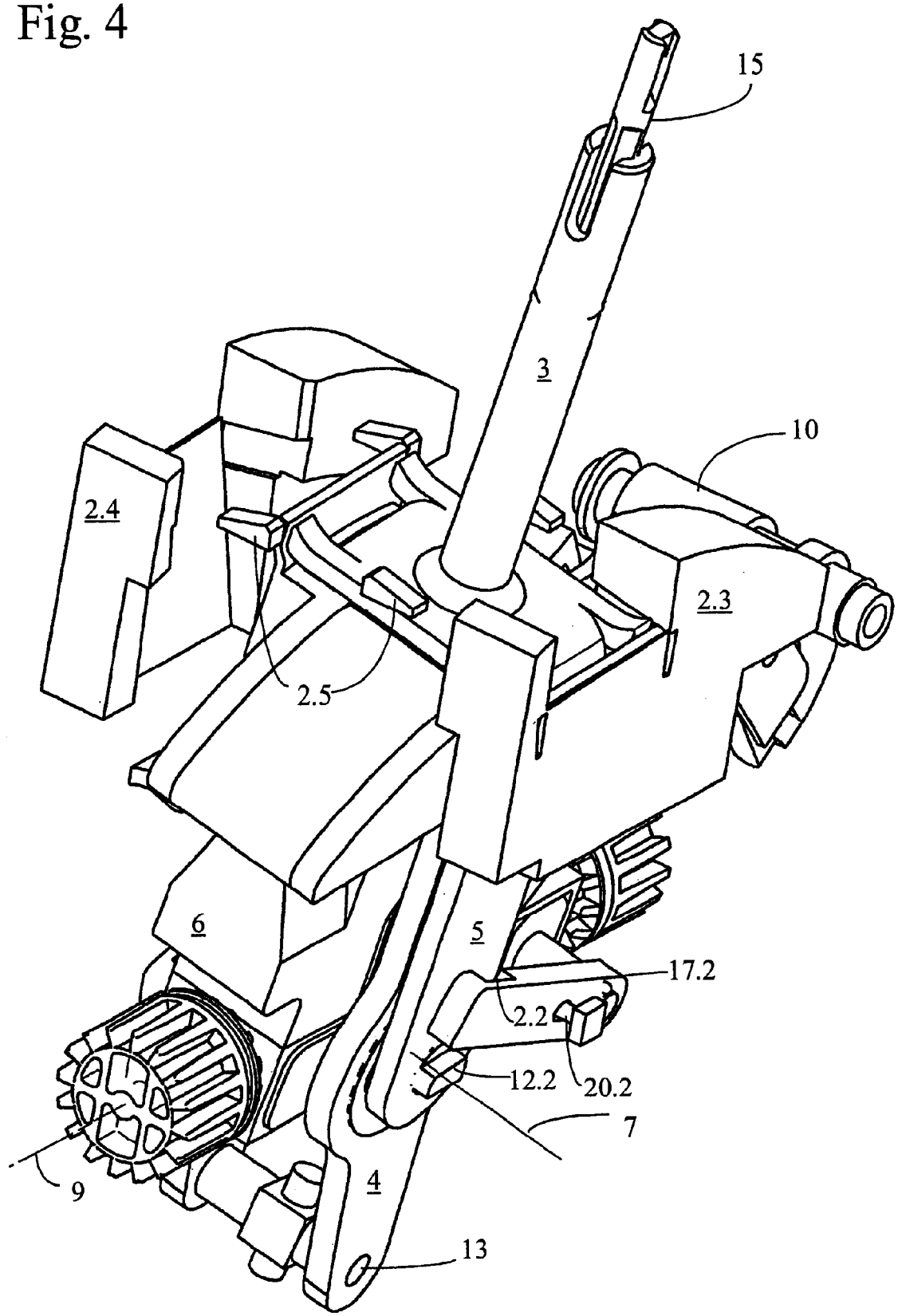
FIG. 4 is a perspective side view of the shifting device from the right with the selector lever in the middle position in the right-hand sequence shift gate.

FIG. 4 shows the shifting device 1 with the selector lever 3 in a lateral movement space, i.e., in a sequence shift gate in this case, where the selector lever 3 is in the middle position concerning its pivoting movement in the direction of the vehicle. It can be clearly recognized that the locking element 12.2 is disengaged from the locking element engagement 2.2 of the upwardly pivoted swivel arm 17.2, so that the outer bridge 5 can be pivoted around the second shift axis 8.

Figure 4A:
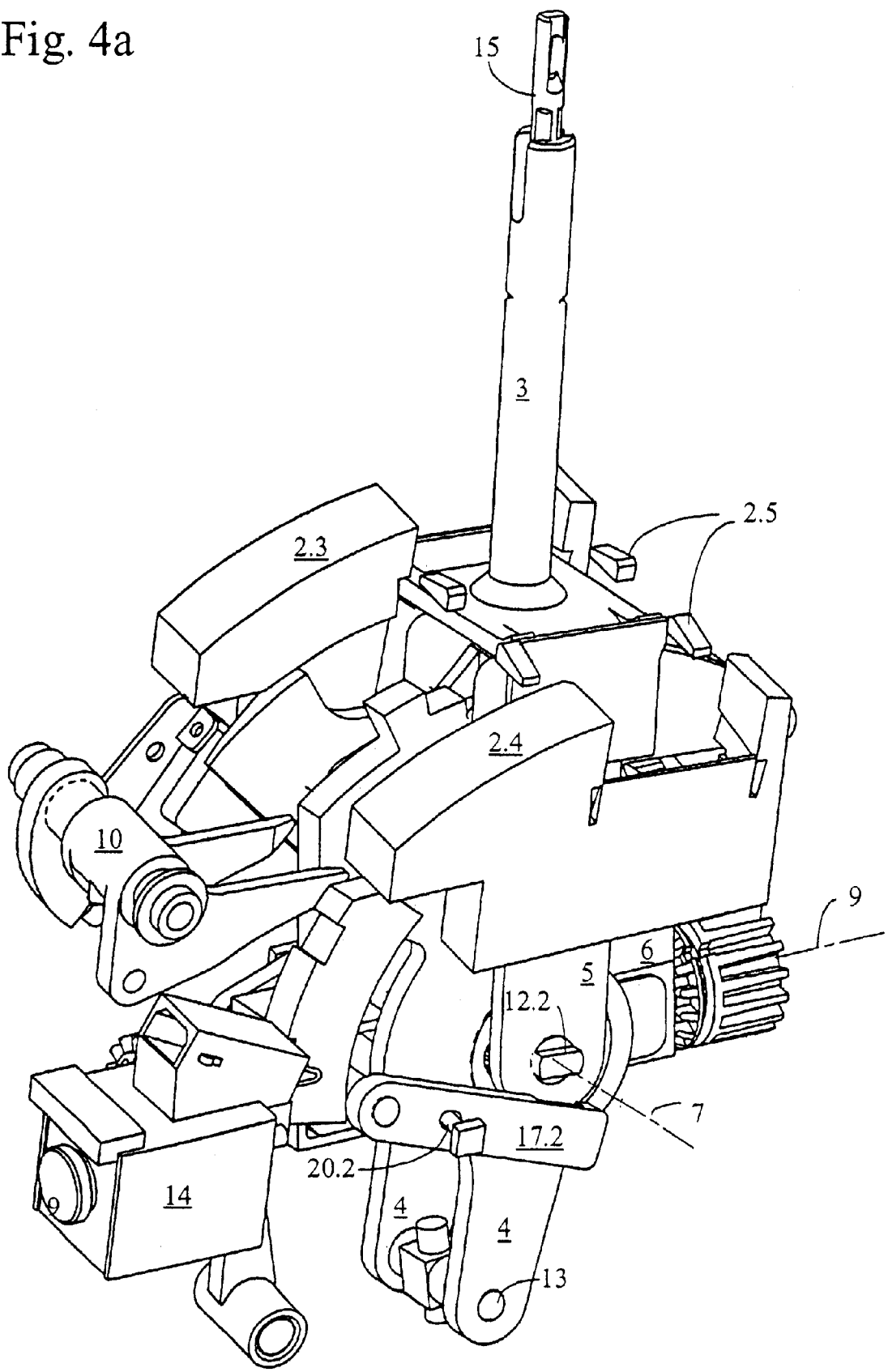
FIG. 4a is a perspective side view of the shifting device from FIG. 4 from the left.

FIG. 4a shows the shifting device in the same position as FIG. 4, but from the opposite side. It can also be clearly recognized here that the locking element 12.1 is disengaged from the locking element engagement 2.1 of the downwardly pivoted swivel arm 17.1, so that the outer bridge 5 can be moved around the second shift axis 8.

Figure 5:
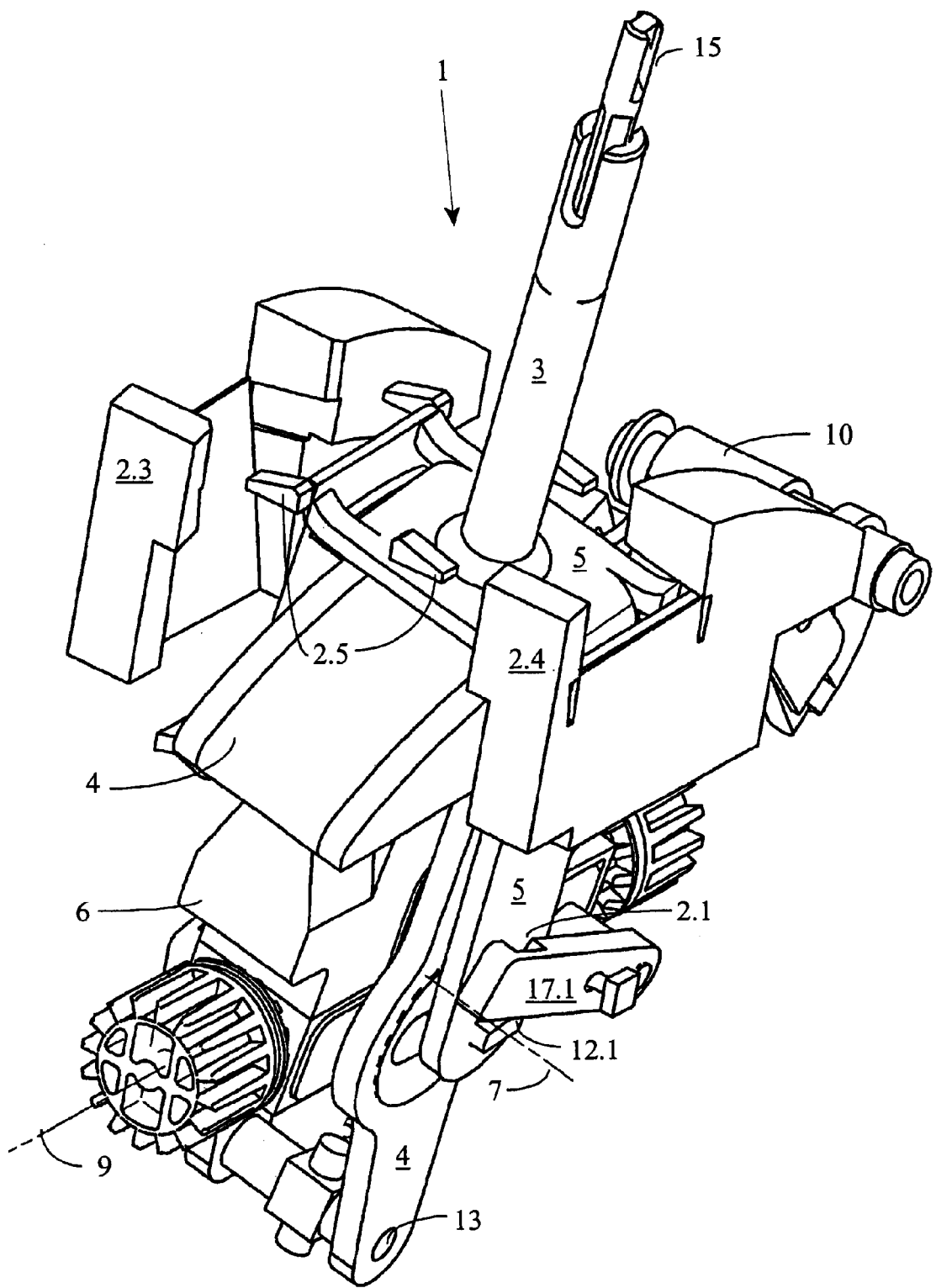
FIG. 5 is a perspective side view of the shifting device from the right with the selector lever retracted in the right-hand sequence shift gate.

FIG. 5 shows the freedom of movement of the selector lever 3 in the longitudinal direction, as soon as this selector lever is in the lateral sequence shift gate.

FIGS. 1 through 5 additionally also show a "Key Lock" system and a "Shift Lock" system. Both systems have been known from the prior art, e.g., from the applicant's patent application DE 195 56 034, whose disclosure content is herewith taken over into the present application and their functions will not therefore be described once again.

Figure 6:
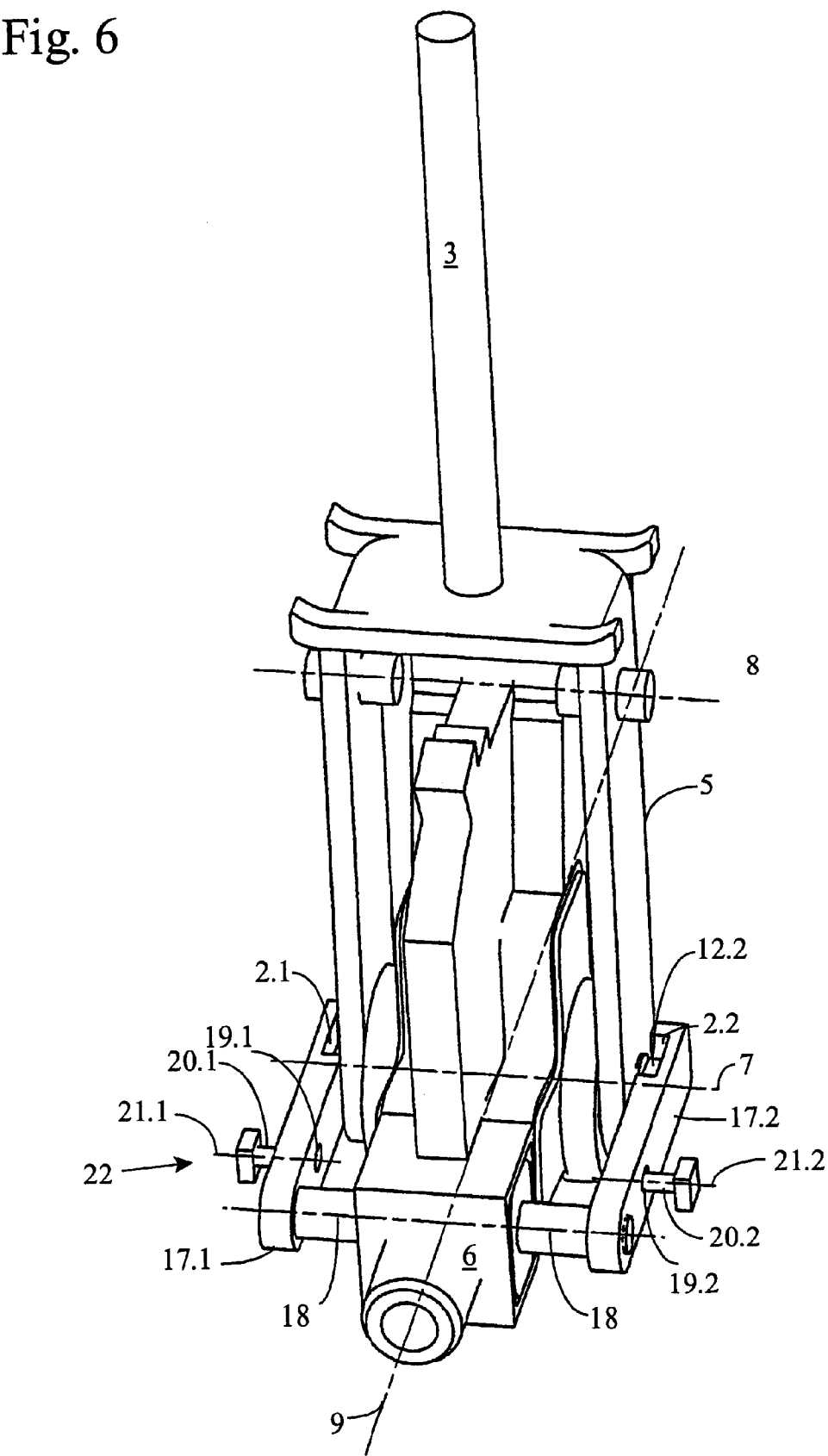
FIG. 6 is a perspective front view of the shifting device with the selector lever in the middle position in the automatic shift gate.
Figure 7:
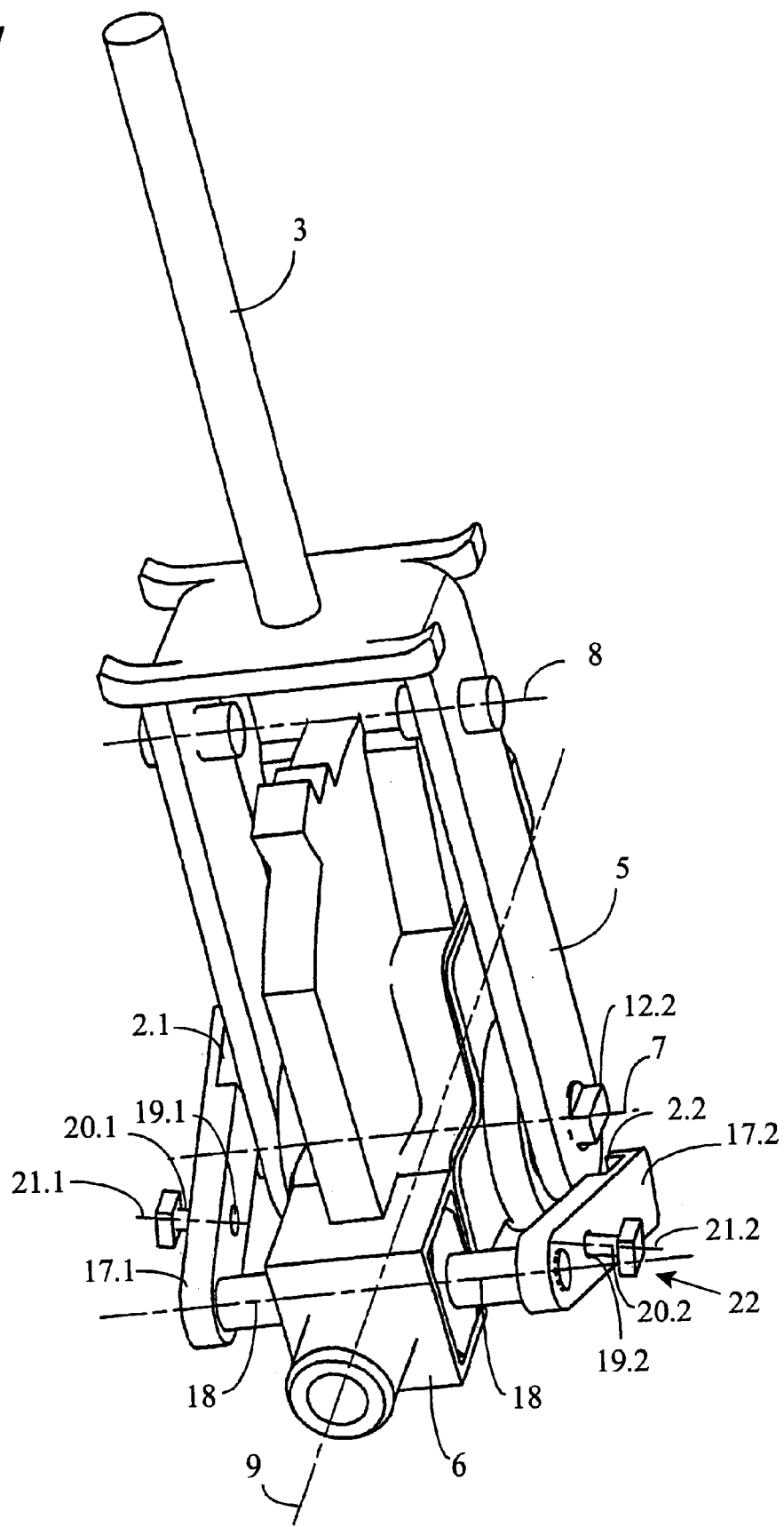
FIG. 7 is a perspective front view of the shifting device with the selector lever deflected laterally to the left in a sequence shift gate.
Figure 8:
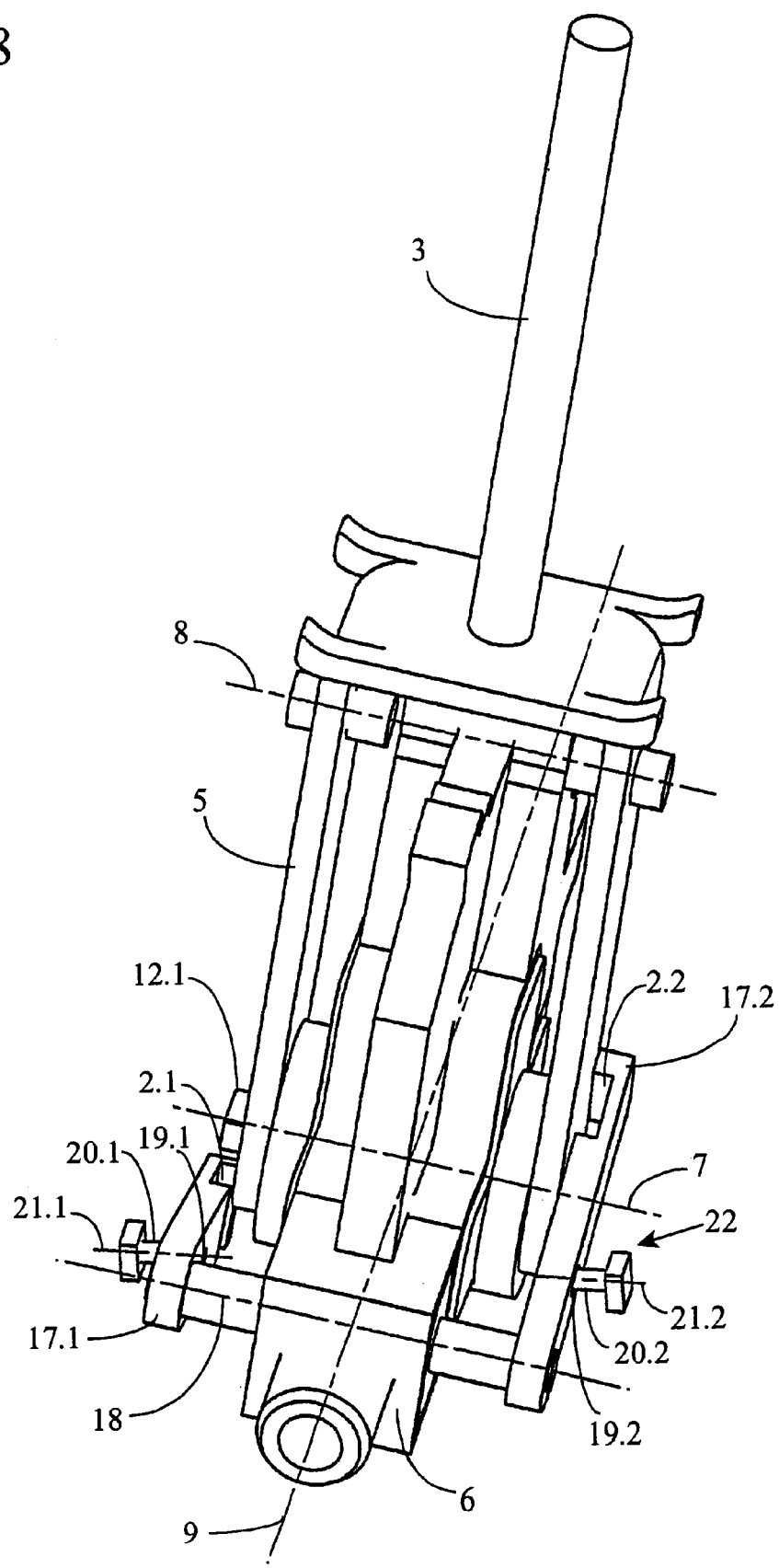
FIG. 8 is a perspective front view of the shifting device with the selector lever deflected laterally to the right in a sequence shift gate.

FIGS. 6 through 8 show different perspective views of the cooperation of the outer bridge 5 and the swivel arms 17.1 and 17.2 to lock and unlock the selector lever 3 in the different positions in the gate.

FIG. 6 shows the selector lever in a position in the automatic shift gate. Both laterally arranged swivel arms 17.1 and 17.2 have the same position and the locking elements 12.1 and 12.2 respectively engage the locking element engagements 2.1 and 2.2, so that movement of the outer bridge 5 and of the selector lever 3 around the first shift axis 7 is made possible.

FIGS. 7 and 8 show a selector lever 3, which is pivoted out to the left and right, respectively, and which is in a lateral position in a sequence shift gate. Easy raising or lowering of the locking elements 12.1 and 12.2 and at the same time a movement of the swivel arms 17.1 and 17.2 in the opposite direction are brought about in these positions, so that the locking elements 12.1 and 12.2 move out of the locking element engagements 2.1, 2.2 at the end of the swivel arms 17.1, 17.2 and the arms of the outer bridge 5 thus become freely movable. Movement of the selector lever 3 around the upper, second shift axis 8, which is used in the vehicle for the upshifting and downshifting of the sequential transmission control, can now take place.

Figure 9:
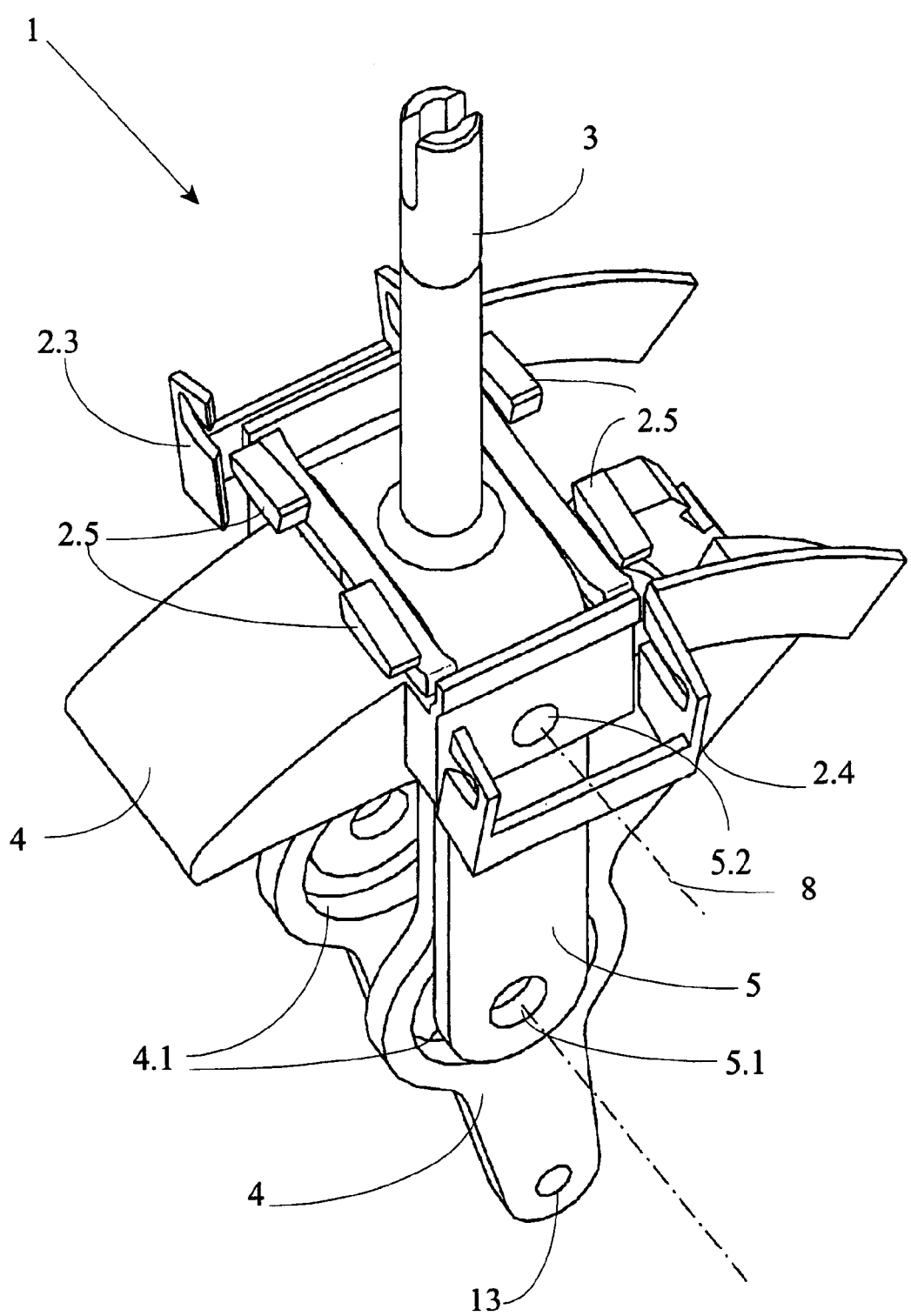
FIG. 9 is a perspective side view of the inner and outer bridges with parts of the housing from the right with the selector lever in the middle position in the automatic shift gate.

FIG. 9 shows the inner bridge 4 with the two axial openings 4.1, which are engaged by the axial element 11.1 of the mounting insert 11 in the assembled state. The outer bridge 5 extends around the inner bridge 4, and the two arms of the bridges also have an axial opening 5.1 in the lower area, and the locking elements 12.1 and 12.2, which will then cooperate with the locking element engagements 2.1 and 2.2 of the housing 2, can be inserted into the axial opening 5.1. The selector lever 3 is in the middle movement space in this view, which usually corresponds to the automatic shift gate.

Figure 10:
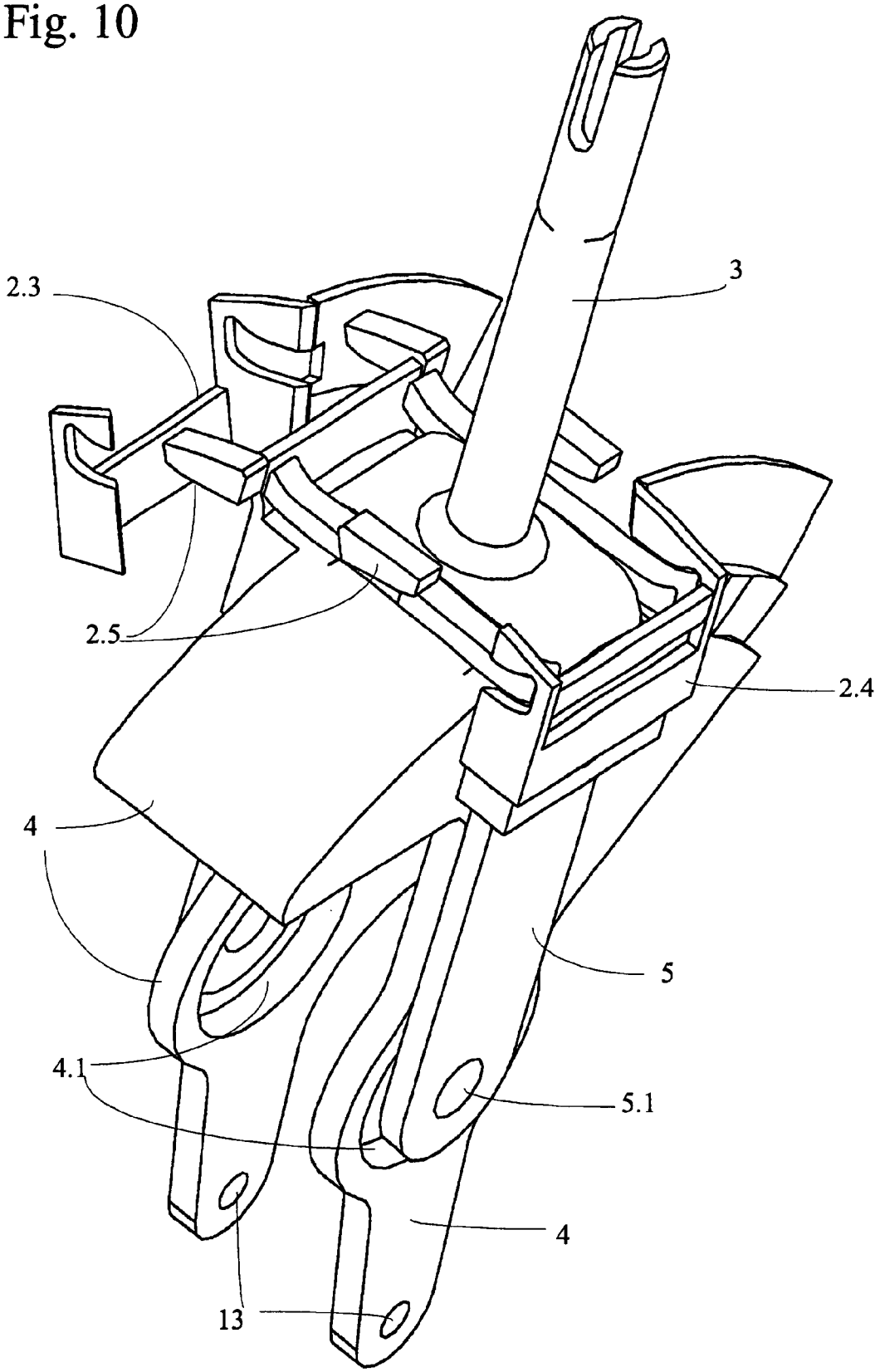
FIG. 10 is a perspective view of the inner and outer bridges with parts of the housing from the right with the selector lever in the middle position in the sequence shift gate.

FIG. 10 shows a view similar to that in FIG. 9, but the selector lever 3 is pivoted laterally and is in the middle position concerning the pivoting movement around the second shift axis 8.

Figure 11:
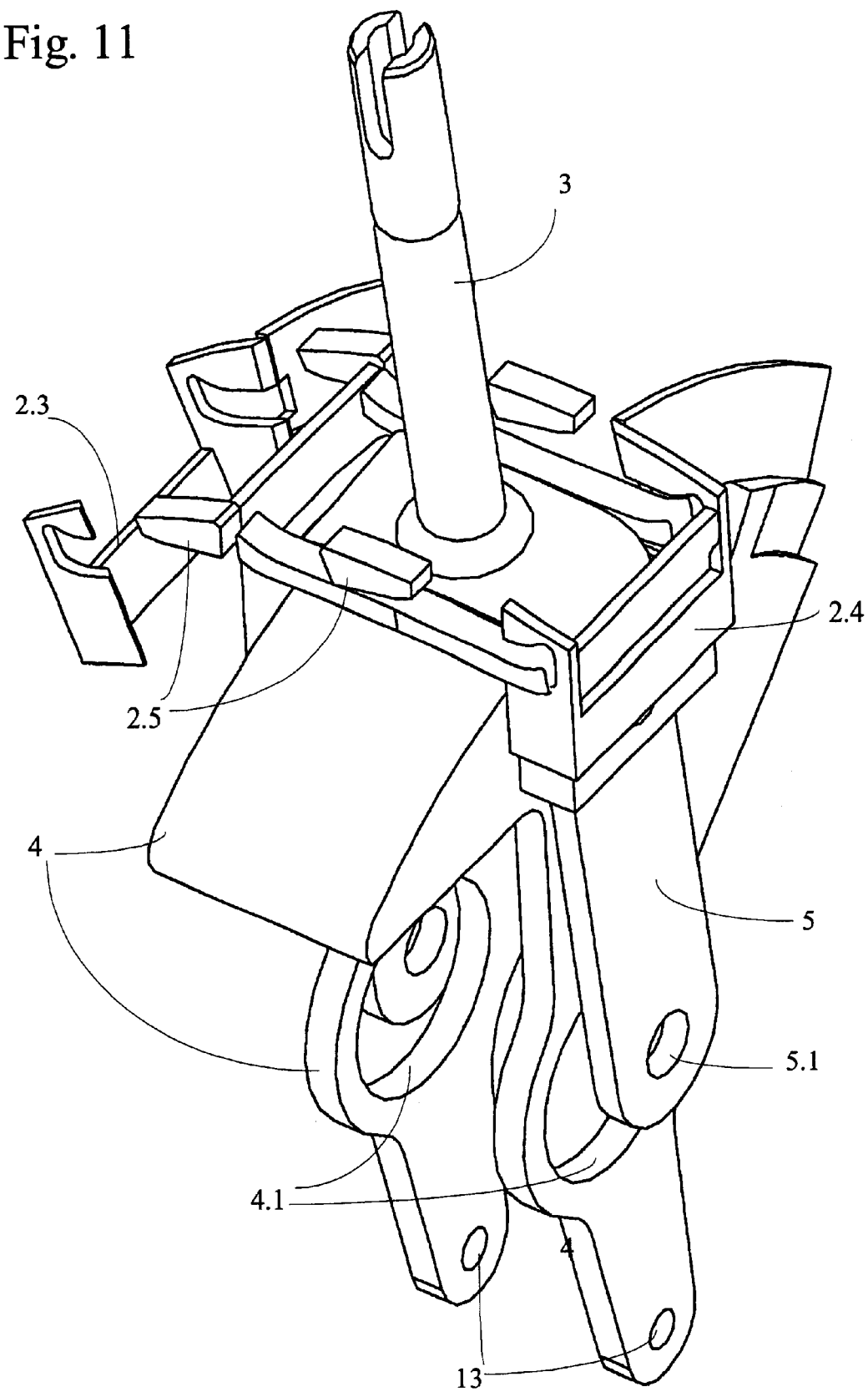
FIG. 11 is a perspective side view of the inner and outer bridges with parts of the housing from the right with the selector lever retracted in the sequence shift gate.

FIG. 11 shows how the selector lever is deflected around the second shift axis 8 in a sequence shift gate against the direction of the vehicle. It can be clearly recognized here that the axial openings 4.1 and 5.1 have become positioned eccentrically in relation to one another.

Figure 12:
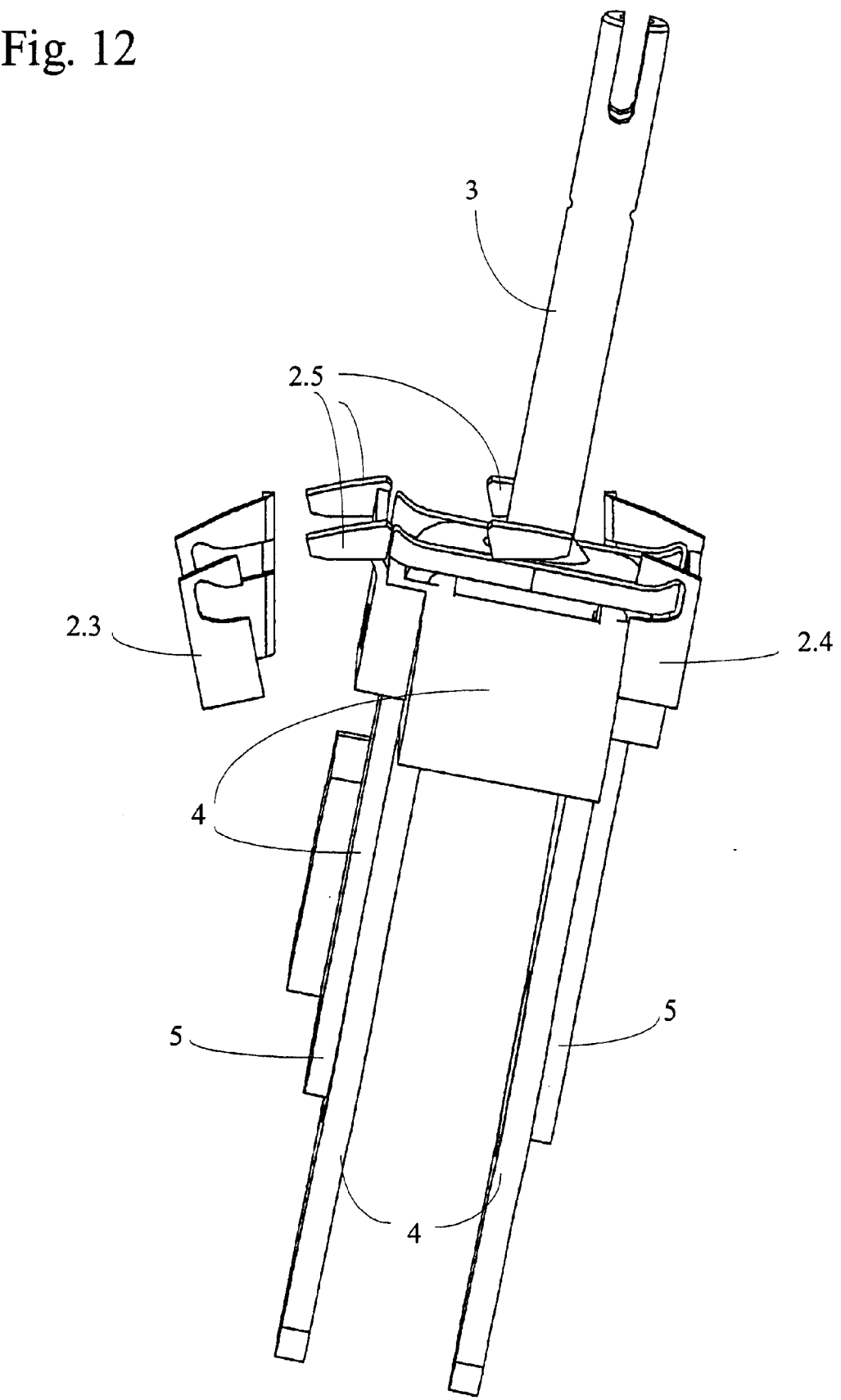
FIG. 12 is a perspective view of the inner and outer bridges with parts of the housing from behind with the selector lever in the sequence shift gate.

FIG. 12 shows the situation from FIG. 11 in a front view in the direction of the vehicle.

FIGS. 13 through 16 show schematic views of the movement spaces of the selector lever of the device according to the present invention and optionally of the movement gates arranged therein.

Figure 13:
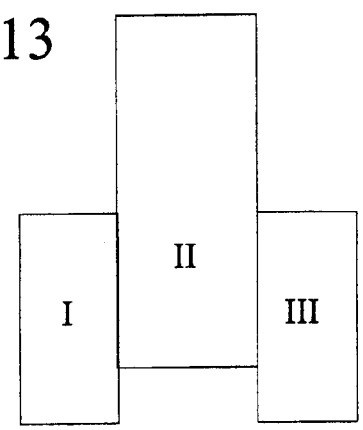
FIG. 13 is a schematic view of the movement spaces and movement shifting gates in Section A—A in FIGS. 17 and 18.
Figure 15:
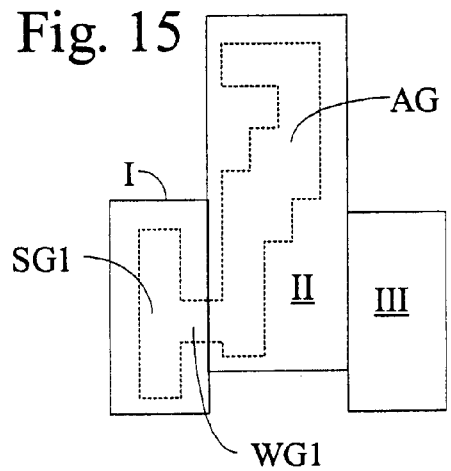
FIG. 15 is a schematic view of the movement spaces and movement shifting gates in Section A—A in FIGS. 17 and 18.
Figure 16:
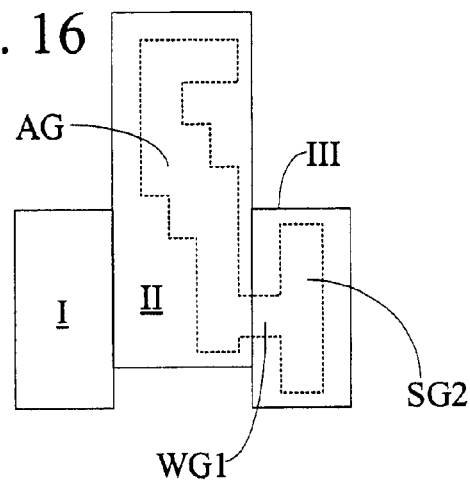
FIG. 16 is a schematic view of the movement spaces and movement shifting gates in Section A—A in FIGS. 17 and 18.
Figure 17:
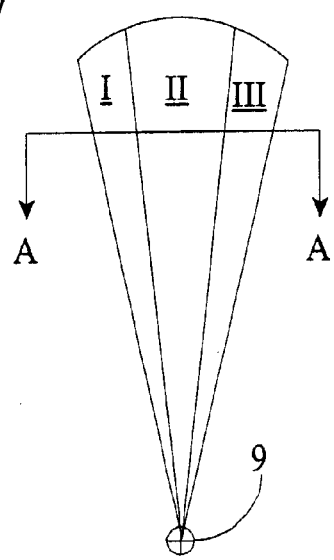
FIG. 17 is a schematic view of the movement spaces and movement gates in a sectional view from behind.
Figure 18:
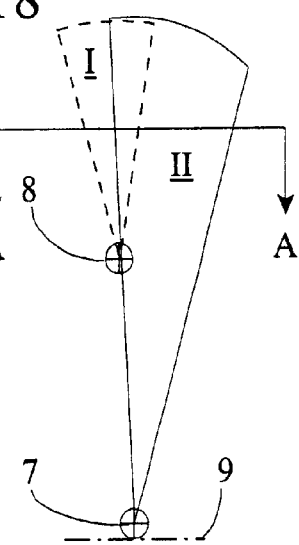
FIG. 18 is a schematic view of the movement spaces and movement gates in a sectional view from the side.

FIGS. 13 through 16 show a section A—A from FIGS. 17 and 18 and show the movement spaces of the example of a shifting device according to the present invention in one plane. FIG. 13 shows the movement spaces I, II and III, which consist of three mutually adjacent rectangles in their top view. The middle rectangle II corresponds to the movement space to which an automatic shift gate can be assigned, while the movement spaces I and III, which are arranged on both sides and are arranged in parallel in their longitudinal extension, represent the movement spaces which can be used for the sequence shift gate or optionally also for two different functions.

Figure 14:
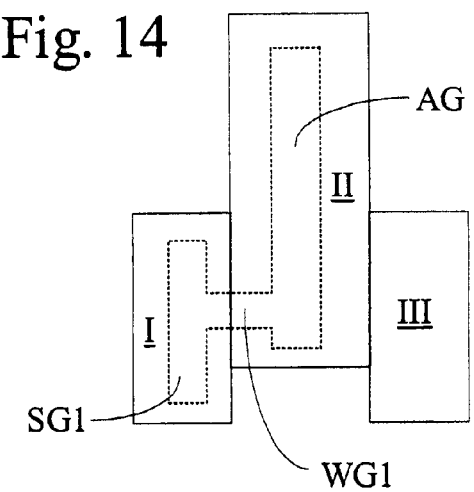
FIG. 14 is a schematic view of the movement spaces and movement shifting gates in Section A—A in FIGS. 17 and 18.

FIG. 14 shows as an example two shift gates, namely, the automatic shift gate AG and the sequence shift gate SG1, where the two shift gates are in connection with one another via the selection gate WG1. Such a design of the shift gate is considered essential when a locking means for the shifting movement is present in the automatic shift gate.

If the shifting device with the movement spaces being shown here is used in vehicles with different positions of the steering wheel (vehicles with the steering wheel on the right or vehicles with the steering wheel on the left), the arrangement of the shift gates can be adapted to the positioning of the driver's seat in a simple manner, e.g., by replacing the cover. It is possible to do away with the change in the shifting device proper, which is otherwise complicated.

FIGS. 15 and 16 show a corresponding example of a shifting device with the same 5 movement spaces I through III. The difference between the two embodiments of a shifting device according to FIG. 15 and FIG. 16 is that a mirror-inverted cover with movement gates arranged correspondingly in a mirror-inverted manner is used for the selector lever.

A front view of the movement spaces I, II and III is schematically shown in FIG. 17 once again, while FIG. 18 shows a side view of the same movement spaces, and the positioning, especially of the first shift axis 7 and of the second shift axis 8, as well as the position of the selector axis 8 are shown in FIG. 18.

Figure 19:
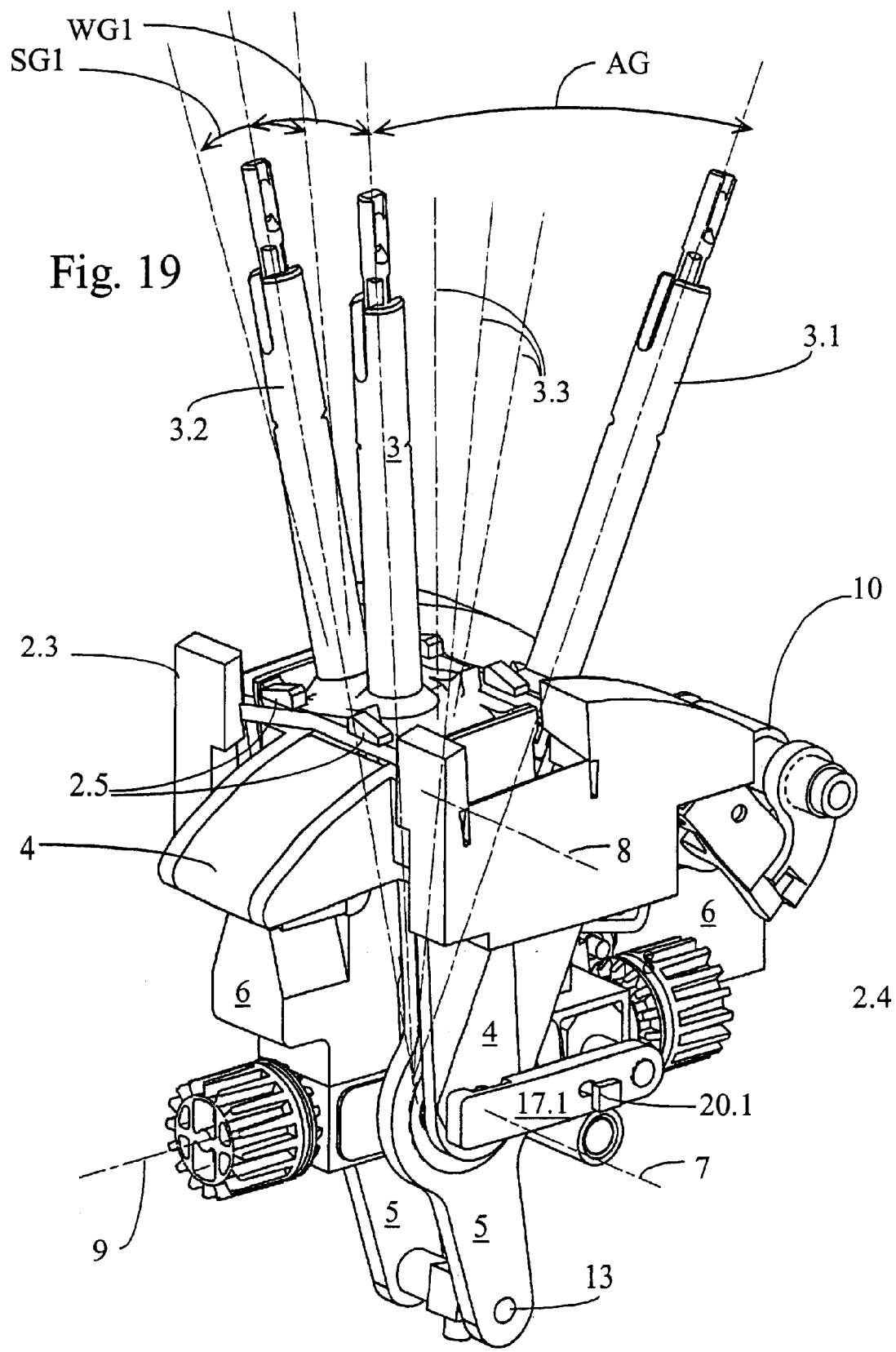
FIG. 19 is a perspective view of the shifting device with the selector lever in two different positions in the automatic shift gate and a middle position in the sequence shift gate from a first perspective.
Figure 20:
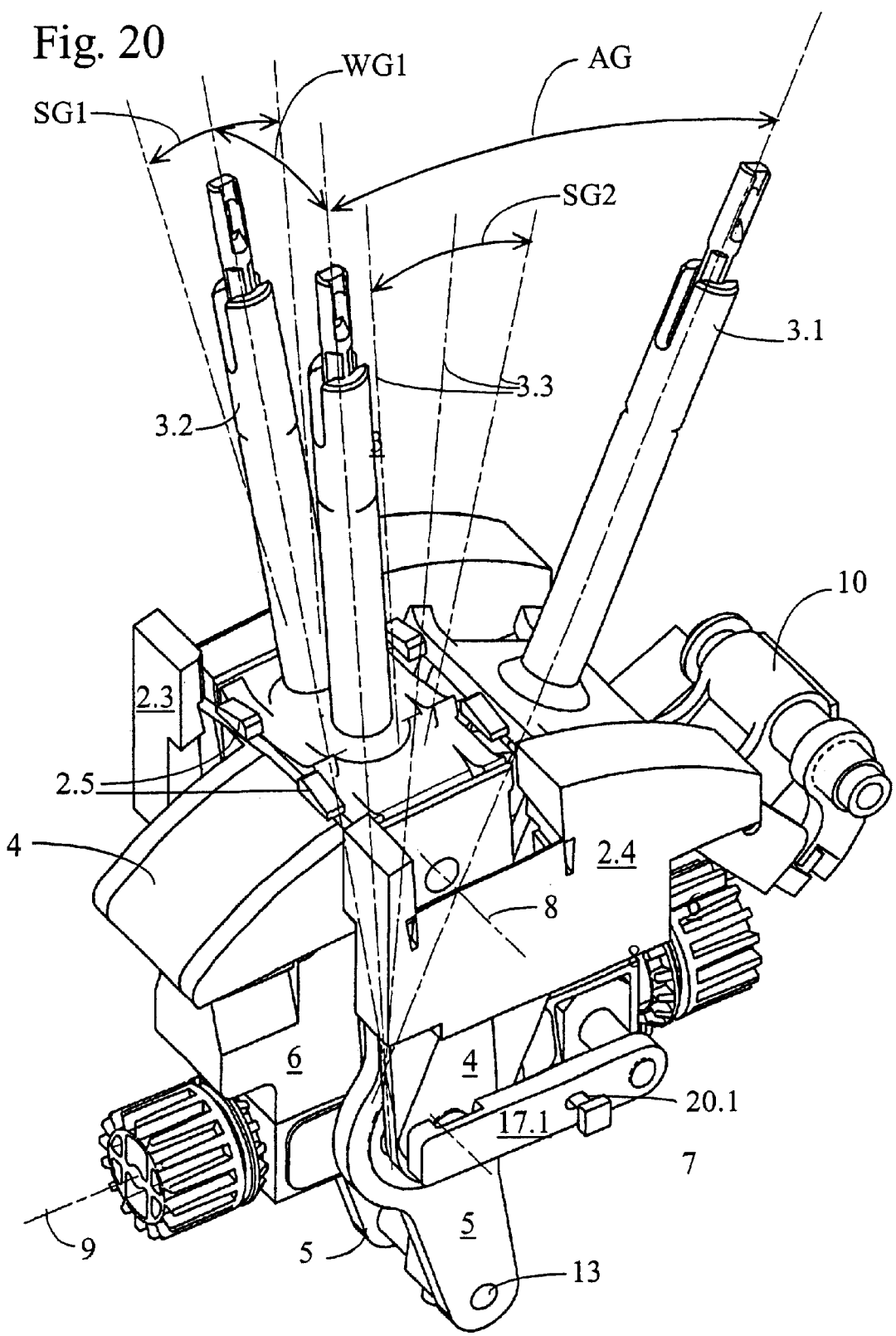
FIG. 20 is a perspective view of the shifting device with the selector lever in two different positions in the automatic shift gate and a middle position in the sequence shift gate from a different perspective.

To further illustrate the present invention, FIGS. 19 and 20 show the possible positioning of the selector lever, including the movement gates, in two different perspectives. The positioning of the bridges 4 and 5 and of the central carrier 6 shown reflects the situation with the selector lever 3 in a middle position in the automatic shift gate. The two selector lever positions 3.1 and 3.2 shown additionally next to it show different movement situations of the selector lever. The selector lever position 3.1 corresponds to a position of the selector lever 3 in the automatic shift gate in the frontmost position (position "P"), while in position 3.2, the selector lever is shown moved out to the left into the sequence shift gate. The right-hand side of the possible positions of the selector lever 3 in the right-hand sequence shift gate is additionally indicated by the reference number 3.3.

Consequently, the shifting device described according to the present invention is, on the whole, a shifting device which is equally suitable for vehicles with the steering wheel on the right and for vehicles with the steering wheel on the left and can be manufactured at the same time with components on which low requirements are imposed in terms of the manufacturing tolerances, and the clearance of the shifting device is not impaired or is even improved, i.e., reduced, compared with the prior-art design.

While specific embodiments of the invention have been shown and described in detail to illustrate the application of the principles of the invention, it will be understood that the invention may be embodied otherwise without departing from such principles.

What is claimed is:

1. A shifting device of a motor vehicle automatic transmission, the shifting device comprising:
    a selector lever movable into three substantially parallel and adjacent movement spaces;
    an automatic shift gate corresponding to a middle movement space of said three adjacent and substantially parallel movement spaces;
    a sequence shift gate corresponding to one side movement space of said three adjacent and substantially parallel movement spaces;
    a kinematic arrangement for transmitting the selection movements of said selector lever to an automatic transmission, wherein said selector lever can be moved around a first shift axis in said automatic shift gate for selecting automatic gears and around a second shift axis in said sequence shift gate for manually upshifting and downshifting gears, said kinematic arrangement including a central carrier pivotable around a selector axis, an inner bridge mounted pivotable on said central carrier and pivotable around said first shift axis extending essentially at right angles to said selector axis, and an outer bridge mounted on said inner bridge in said sequence shift gate pivotable around said second shift axis and connected to said selector lever; and
    a selector for selecting the shift axes by a pivoting movement of said selector lever, said selector being indirectly or, directly fastened to said central carrier.

2. A shifting device in accordance with claim 1 above, wherein the selector provides a pivoting movement of the selector lever around said first shift axis in the case of the selection of the automatic gate and a pivoting movement of said selector lever around said second shift axis in the case of the selection of the sequence shift gate.

3. A shifting device in accordance with claim 1, further comprising a movement gate and/or movement space limiter.

4. A shifting device in accordance with claim 3, further comprising;
    a housing connectable to a vehicle, said movement gate and/or movement space limiter is fastened at least partly to said housing.

5. A shifting device in accordance with claim 3, wherein said movement gate and/or movement space limiter is fastened at partly to said inner bridge.

6. A shifting device in accordance with claim 3, wherein said movement gate and/or movement space limiter is fastened at least partly to said outer bridge.

7. A shifting device in accordance with claim 1, wherein the automatic shift gate and said sequence shift gate are formed in one of a width direction and width and a length direction by a movement shifting gate for said selector lever.

8. A shifting device in accordance with claim 7, wherein said movement shifting gate has a single said automatic shift gate and a single said sequence shift gate, wherein a connection gate is provided between said automatic shift gate and said sequence shift gate.

9. A shifting device in accordance with claim 1, wherein said first and second shift axes are arranged eccentrically in relation to one another.

10. A shifting device in accordance with claim 1, wherein said first and second shift axes are arranged in parallel to one another.

11. A shifting device in accordance with claim 1, wherein a distances between said first and second shift axes and a shift knob at the end of said selector lever differ.

12. A shifting device in accordance with claim 1, further comprising one of a cable, and a linkage, for transmitting a shifting movement of said selector lever, in at least one gate, to a motor vehicle transmission.

13. A shifting device in accordance with claim 1, further comprising an electronic transmission device for transmitting a shifting movement of said selector lever, in the sequence gate, to the motor vehicle transmission.

14. A shifting device in accordance with claim 1, further comprising one of a key lock and a shift lock system.

15. A shifting device of a motor vehicle automatic transmission, the shifting device comprising:
a selector lever;
an automatic shift gate and sequence shift gate;
a kinematic arrangement for transmitting the selection movements of said selector lever to an automatic transmission, wherein said selector lever can be moved around a first shift axis in said automatic shift gate for selecting automatic gears and around a second shift axis in said sequence shift gate for manually upshifting and downshifting gears, said kinematic arrangement including a central carrier pivotable around a selector axis, an inner bridge mounted pivotable on said central carrier and pivotable around said first shift axis extending essentially at right angles to said selector axis, and an outer bridge mounted on said inner bridge in said sequcace shift gate pivotable around said second shift axis and connected to said selector lever; and
a selector for selecting the shift axes by a pivoting movement of said selector lever, said selector being indirectly or directly fastened to said central carrier, said selector including swivel aims mounted pivotably on a third axis extending at right angles to said selector axis and offset from said first shift axis, said swivel arms each having at least one locking element engagement and a locking element associated with said outer bridge, each locking element engaging a respective one of said locking element engagements depending on apposition of said selector lever.

16. A shifting device in accordance with claim 15, wherein said swivel arms have a mount each arranged eccentrically to said third axis.

17. A shifting device in accordance with claim 16, wherein a distance between said mount and said third axis is equal to or smaller than a distance between said mount and said locking element engagement.

18. A shifing device in accordance with claim 17, wherein said mount is a movable mount with two degrees of freedom.

19. A shifting device in accordance with claim 17, wherein said mount has an opening in said swivel arm and a stationary mounting pin, which engages said opening and is preferably connected to a shifting housing, a longitudinal axis of said mounting pin being arranged coaxially when said selector lever is positioned in said automatic gate.

20. A shifting device in accordance with claim 15, wherein said third axis intersects said selector axis.

21. A shifting device in accordance with claim 15, wherein said first shift axis extends through said looking element, of which there is at least one.

22. A shifting device in accordance with claim 15, wherein said locking element and said locking element engagement bring about a connection between said inner bridge and said outer bridge, the connected said inner bridge and said outer bridge rotating in unison.

23. A shifting device of a vehicle, the device comprising:
a carrier rotatable about a selector axis between a first side position, a middle position, and a second side position, said first and second side positions being on diametrically opposite sides of said carrier middle position;
a first bridge pivotally connected to said carrier about a first shift axis and movable between a first bridge position, and a second bridge position, said first shift axis being substantially perpendicular to said selector axis, said first bridge pivoting with said carrier about said selector axis;
a second bridge pivotally connected to said first bridge about a second shift axis, said second bridge pivoting with said carrier about said selector axis;
a selector lever connected to said second bridge
a guide defining a first side shift gate, a middle shift gate and a second side shift gate, said first and second side shift gates being arranged on diametrically opposite sides of said middle shift gate at said first bridge position.

24. A device in accordance with claim 23, wherein:
said guide causes said middle shift gate to limit pivotal movements of said first bridge to said middle position of said carrier, said guide locks said second bridge to said first bridge in said middle shift gate.

25. A device in accordance with claim 24, wherein:
said guide causes said first side shift gate to hold said first bridge in said first bridge position and said first side position of said carrier, said guide unlocks said second bridge from said first bridge in said first side shift gate;
said guide causes said second side shift gate to hold said first bridge in said first bridge position and said second side position of said carrier, said guide unlocks said second bridge from said first bridge in said second side shift gate.

26. A device in accordance with claim 23, wherein:
said guide causes said first side shift gate to hold said first bridge in said first bridge position and said first side position of said carrier, said guide causes said second bridge to be independently pivotal about said second shift axis in said first side shift gate;
said guide causes said second side shift gate to hold said first bridge in said first bridge position and said second side position of said carrier, said guide causes said second bridge to be independently pivotal about said second shift axis in said second side shift gate.

27. A device in accordance with claim 23, wherein:
said first side shift gate, said middle shift gate and said second shift gate are substantially parallel and adjacent;
said carrier is connected to an automatic and sequential shifting transmission;
movement of said selector lever in said middle shift gate controls automatic shifting of said transmission;
movement of said selector lever in one of said side shift gates controls sequence shifting of said transmission;
each of said first and second side shift gates can selectively be chosen for sequence shifting of said transmission;
said guide also defines a selection gate connecting said first side shift gate, said middle shift gate and said second side gate, said selection gate being substantially straight.

28. A device in accordance with claim 23, further comprising:
a cover surrounding said selector lever, said cover limiting movement of said selector lever to said middle shift gate and one of said side shift gates.

* * * * *